Sept. 9, 1969    A. C. KOETT    3,465,414
PNEUMATIC STITCHER AND METHOD OF STITCHING
Filed Oct. 18, 1965    3 Sheets-Sheet 1
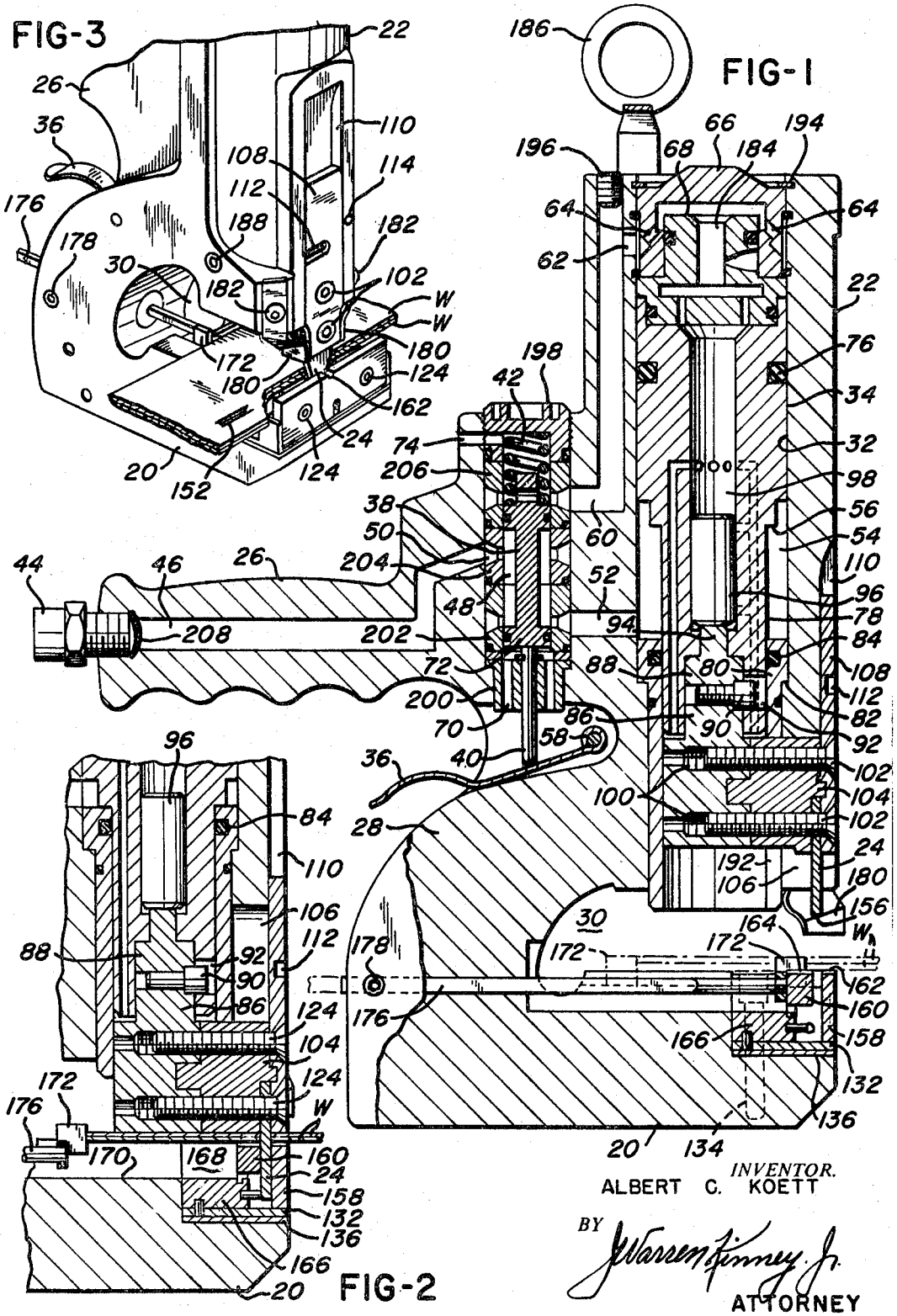
INVENTOR.
ALBERT C. KOETT
BY J. Warren Kinney Jr.
ATTORNEY

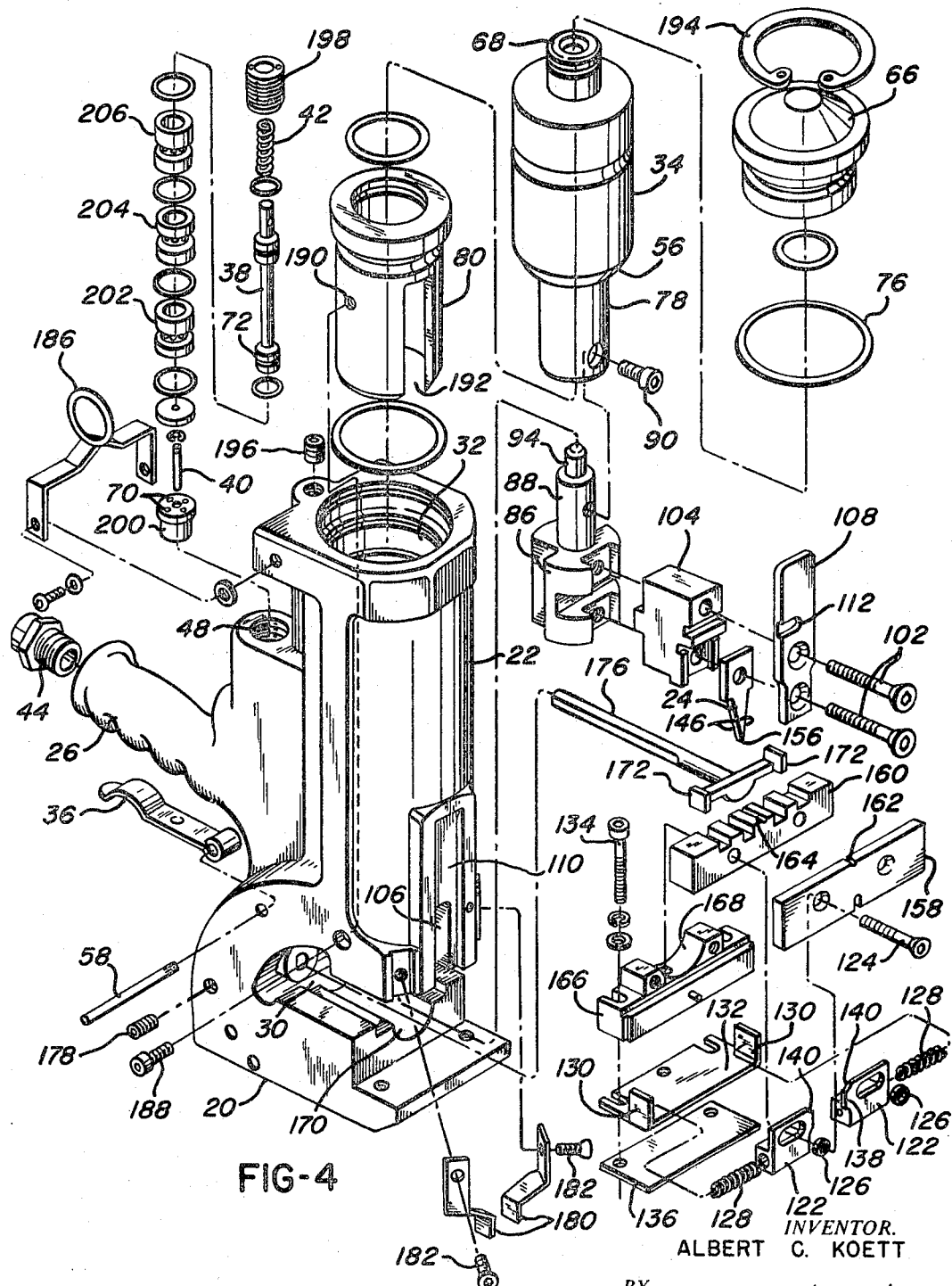

Sept. 9, 1969  A. C. KOETT  3,465,414
PNEUMATIC STITCHER AND METHOD OF STITCHING
Filed Oct. 18, 1965  3 Sheets-Sheet 3
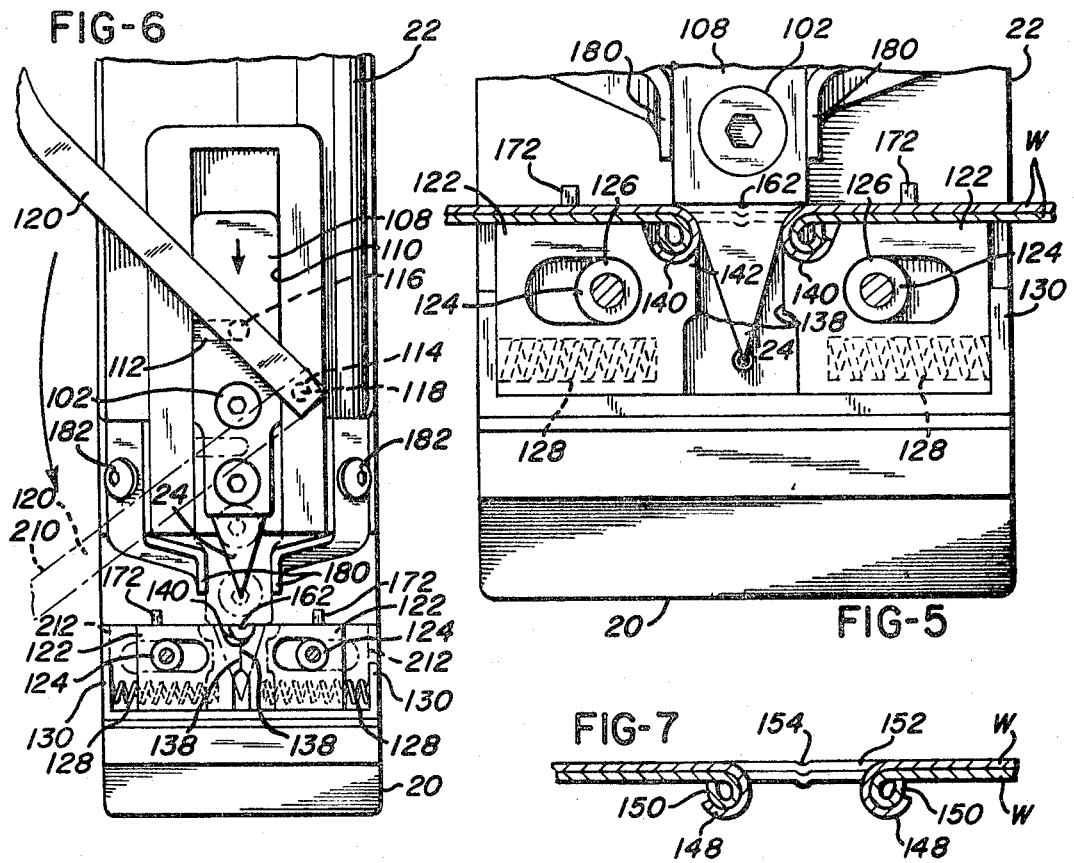
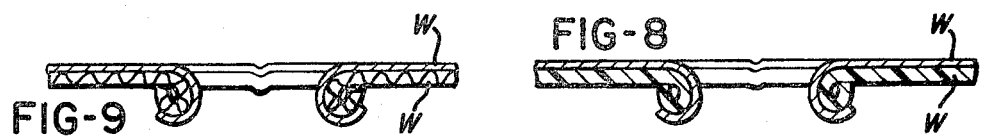
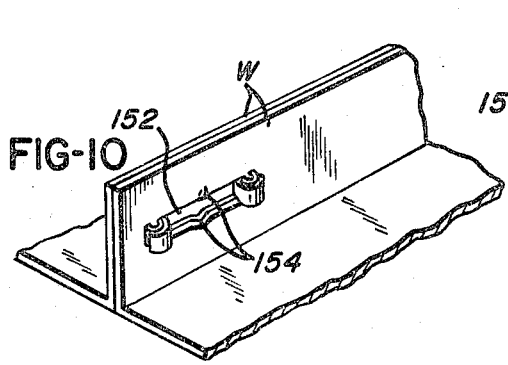
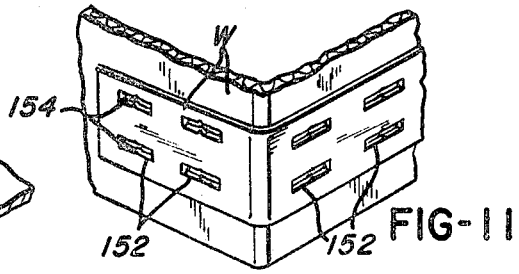
INVENTOR.
ALBERT C. KOETT
BY
ATTORNEY

United States Patent Office 3,465,414
Patented Sept. 9, 1969

3,465,414
PNEUMATIC STITCHER AND METHOD
OF STITCHING
Albert C. Koett, 2112 Glenside Ave.,
Cincinnati, Ohio 45212
Filed Oct. 18, 1965, Ser. No. 497,246
Int. Cl. B21d 39/00; B23p 11/00
U.S. Cl. 29—432.2     22 Claims

ABSTRACT OF THE DISCLOSURE

The stitcher joins two work sheets flatwise, by means of a chisel-like tool which initially descends upon the work sheets to first slightly deform them into a shallow forming-die recess, to prevent lateral shifting thereof, followed immediately and automatically by a rapid succession of hammer blows directed upon the tool to progressively cut narrow tongues in the material of the work sheets, while the forming dies curl the tongues into interlocking relationship at once face of one of the work sheets; all of which is accomplished by a portable light-weight apparatus that may easily be carried to the work site by one operator. The apparatus is operated pneumatically by preference and includes self-adjusting forming dies for curling the tongues produced by the vibratory tool.

---

The present invention relates to a pneumatic stitcher for securing together sheets of metal and other sheet materials, and including an improved method of stitching.

By means of the method and apparatus herein disclosed, two or more sheets or strips, at least one of which is metal, may be joined together flatwise without the use of separate fasteners, the connection being effected by utilizing an integral portion of the metallic sheet or strip comprising the assembly of sheets or strips.

As the description proceeds, it will be appreciated that the terms "sheets" and "strips" are synonymous as herein used, the intention being to consider as "sheets" all forms of strips, bands, ribbons and the like which might be superposed one upon another in substantial flatwise contact, for firm unitary connection. Thus, in FIGS. 7 to 11 inclusive, are shown connections made by stitching, or displacement of metal, involving a metal sheet and sheets of other material flatly superposed thereon, such other materials being by way of example, cardboard, fiberboard, corrugated paper board, rubber-like sheeting, or other sheets of metal.

An object of the present invention is to provide an improved stitching tool, operated pneumatically, which will effectively join two or more sheets speedily and without effort on the part of an operator.

Another object of the invention is to provide a tool of the character stated, which is highly durable, dependable in operation, and constructed to require a minimum of servicing throughout extended periods of use.

A further object is to provide a stitching tool for the purposes stated, which in portable form, is very light in weight and easy to manipulate, so that operator fatigue and down-time are largely minimized.

Another object of the invention is to provide an improved pneumatic stitching tool incorporating means to facilitate and expedite punch and die replacement and alignment, when required.

A further object is to provide in a device of the character stated, simple yet effective means to stabilize a workpiece undergoing stitching, so that the work performed will meet high standards of perfection.

A still further object of the invention is to provide a stitching tool having great power in operation, to accomplish rapid and through stitching of tough or heavy sheet materials, and the stripping thereof from the punch or cutter with ease and despatch.

Another object of the invention is to provide an improved method of performing a stitching operation upon superposed sheets, at least one of which is metal.

The foregoing and other objects are attained by the means described herein and illustrated upon the accompanying drawings, in which:

FIG. 1 is a vertical cross-sectional view of the improved stitcher embodying the present invention, and showing the relationship of parts in the inoperative condition of the stitcher.

FIG. 2 is a fragmentary cross-sectional view, showing the punch head and die portion of FIG. 1 operative to complete a stitch.

FIG. 3 is a fragmental perspective view of the punch and die head portion of the tool, in the act of perfecting a stitch upon two superposed work sheets.

FIG. 4 is an exploded perspective view of parts of the stitching tool.

FIG. 5 is an enlarged end view of the punch and die head of the tool, showing the completion of a stitch joining two metallic sheets.

FIG. 6 is a front view of the punch and die head in the inoperative position, and indicating a procedure for rapidly adjusting the dies to the punch.

FIG. 7 is an enlarged cross-sectional view showing a stitch applied by the device of the invention, for joining two metallic flat sheets.

FIG. 8 is a view similar to FIG. 7 showing an upper metallic sheet stitched to a sheet of fiber, rubber, or equivalent sheet material.

FIG. 9 is a similar view, showing an upper sheet of metal stitched to a sheet of corrugated paper board in accordance with the present invention.

FIG. 10 is a perspective view showing the legs of two sheet metal angle members stitched one to the other by the device.

FIG. 11 is a perspective view of a corrugated box corner reinforced by a metallic angle piece stitched thereto in accordance with the method and means of the present invention.

In the drawings 20 indicates a base to support work sheets W, W, and above the base is disposed a cylindrical column 22 which is axially bored at right angles to the plane of the base, for reciprocably supporting a carriage for a triangular punch 24. The punch is adapted to desend upon work sheets W, W to shear and displace portions thereof with the aid of a subjacent die, to produce a stitch such as is illustrated by FIG. 10. In the portable form of stitcher, which is the form selected for illustration herein, the base 20 and column 22 are integral parts of a metal casting which includes a handle 26, and an arch portion 28 for supporting the column 22 above base 20 with an intervening throat 30 to accommodate the work. The metal casting may be of aluminum or other light-weight material for convenience of handling.

If the stitcher is to be used under conditions not requiring portability, base 20 and column 22 may be separate parts mounted and aligned upon a frame or support suitably constructed and adapted for stitching under prescribed conditions or circumstances to be considered.

The upright bore 32 of column 22 supports for reciprocation an elongate plunger or shiftable main body 34, movable between limits of retraction and advancement by means of air under pressure controlled by an operator. That is, body 34 may be pneumatically advanced downwardly toward the work W, W, by manual shifting of a trigger 36 upwardly toward handle 26, and may be retracted pneumatically to an upper limit by release of the trigger, to assume the normal inoperative position of FIG. 1. Trigger 36 controls a reversing valve 38 through the agency of a pin or extension 40. Valve 38 may be a spool valve as shown, biased toward trigger 36 by means of a compression spring 42.

In the spring-biased position of valve 38 (FIG. 1), air under pressure from a source pipe 44 enters the bore 46 of handle 26, then passes into the chamber 48 of the valve by way of inlet port 50. From chamber 48, the pressure of air leaves by way of port 52, to enter the chamber 54 provided by bore 32, and by acting upon the lower face 56 of body 34, forces the body to an elevated position of retraction within said bore. This elevated or retracted position of body 34 is its normal position, and is maintained by pressure of air acting thereon as stated, so long as trigger 36 is inactive.

To lower or advance the body 34, an operator moves trigger 36 clockwise about its pivot 58 to depress pin 40 and thereby shift reversing valve 38 upwardly, against the force of spring 42, to place chamber 48 in communication with port 60. From port 60, pressure of air passes upwardly to a port 62, and by way of one or more passages 64 provided in cap 66, reaches the top face 68 of body 34, to depress or advance the body in the downward direction. During such advancement of body 34, air from chamber 54 beneath the face 56 exhausts through ports 52 and 70, this being made possible by the fact that the spool head 72 has been raised above and beyond the level of port 52.

When trigger 36 is released to permit lowering of valve spool 38 by the action of spring 42, air is exhausted from the area at the top of ascending body 34, by way of ports 64, 62, 60, and 74. FIG. 1 illustrates this condition, which is the normal condition of the apparatus when not operating upon the workpiece.

Main body 34, suitably gasketed as at 76, may include a lower arbor or neck portion 78 reduced in diameter for sliding movement lengthwise within a guide sleeve 80. Guide sleeve 80 is immovably fixed within bore 32 and may rest upon a shoulder 82 of the bore. The neck portion 78 of the guide sleeve may extend to the throat 30 of the device, and is open in the direction of base 20. A suitable gasket 84 precludes leakage of air downwardly from chamber 54.

The lower end of main body or plunger 34 is bored axially to provide a socket 86 to slidably support a cylindrical anvil 88, which anvil has limited reciprocative movements as determined by a stud or screw 90 working in an enlarged opening 92 formed in the side wall of neck 78. The anvil has a top portion 94 to be repeatedly struck by a flying weight 96 rapidly reciprocable in the longitudinal bore 98 of body 34, by pneumatic action.

The lower portion of anvil 88 may be transversely bored and internally threaded as at 100, to receive one or more screws 102 securing a punch mounting block 104 to one side of the anvil. Block 104 is slidable vertically in an elongate slot 106 (FIG. 2), provided in the cylindrical wall of column 22. Thus, anvil 88 and its block 104 move lengthwise of column 22, in substantial correspondency with reciprocation of plunger or body 34, except for a slight differential of movement permitted by stud 90 working in aperture 92.

Since punch or blade 24 is fixed to mounting block 104 by a screw 102, the punch or blade moves toward and from base 20 as body 34 is shifted pneumatically within column bore 32.

For stabilizing movements of the punch and its mounting block 104, and for certain adjusting purposes to be mentioned later, the screws 102 secure to the mounting block a face plate 108 which is adapted to slide in a way or elongate recess 110 formed in the wall of column 22. As FIG. 6 clearly indicates, a transverse elongate slot 112 is provided in face plate 108, and at 114 a hole is drilled in column 22 alongside of way 110. The hole 114 and slot 112 are receptive of two spaced lugs 116 and 118 of a tool 120, which tool is simply a lever for manually elevating and lowering face plate 108, punch 24, and the parts movable therewith, namely, the mounting block 104, anvil 88, and plunger or body 34.

Tool 120 fulcrums at 114, and may be swung to the positions illustrated by the full lines and the broken lines of FIG. 6, to raise and lower the punch 24 manually, and independently of pneumatic operation, whenever the punch is to be replaced or whenever the dies cooperating therewith require replacement or adjustment, as will be explained.

Directly beneath punch 24 is located a pair of forming dies 122 guided on pins 124 carrying nylon spacers 126. The dies normally are yieldingly urged toward one another by springs 128 which are compressed between the dies and the upstanding ears 130 of a retaining member 132. Member 132 is to be adjustably fixed upon base 20 by means of screws 134, which may pass also through a shim plate 136, FIG. 4.

Referring to FIG. 5, each die 122 includes a bumper face 138, these faces being held normally in abutment one against the other as in FIG. 6, by the action of springs 128. At the upper edge of the bumper face, each die is milled or otherwise machined to provide an arcuate stitch curling face 140, which performs to curl a narrow tongue of metal struck out by the die in descending upon the workpiece. Each curling face may include an upwardly directed point 142 adjacent to the upper end of bumper face 138, serving to start a curl as the punch displaces metal downwardly from the workpiece as two opposed single-ended tongues.

It may here be noted that punch 24 has a leading pointed end, FIG. 4, which is chisel-like in that the punch from point to base is of uniform thickness. Accordingly, when the pointed end of the punch strikes a metal sheet, it first impresses a short line in the metal equal in length to the thickness of the punch. Further advancement of the punch results in penetration, with the divergent cutting edges 146 serving each to shear a tongue of metal from the workpiece and to displace the tongues downwardly for entry into the curling recesses 140 of the dies. The width of each tongue will approximate the thickness of punch 24.

As indicated by FIGS. 5 and 7, the workpiece will usually consist of two sheets W, W, to be fastened together flatwise. The punch 24 descending upon the two overlapped sheets, will penetrate both sheets, and will cut opposed tongues in both. Upon further descent, the inclined faces of the punch will direct the tongue ends of both sheets into the curling recesses of the dies. As more metal is cut and displaced from the sheets W, W, the curls will enlarge in diameter, causing dies 122 to move apart against the resistance of springs 128. By the time the punch reaches its lower limit of travel (FIG. 5), the curls of both sheets W, W, will be intertwined and locked together as in FIG. 7.

In FIG. 7, the curled tongues of upper sheet W are identified by the reference character 148, and the curled tongues of the lower sheet W are denoted 150. The reference character 152 indicates an elongate slot of uniform width formed in the work sheets as the result of the punching and curling operation.

Attention is now directed to the small depressions or detents 154, which occur in the connected sheets W, W at opposite sides of slot 152. These detents are formed incident to impingement of punch 24 initially, onto the workpieces to be stitched together. That is, when the point 156 of the punch in FIG. 1 descends upon sheets W, W, its first effect, in advance of penetration, is to depress the metal of the sheets at the point of impact.

The present invention takes advantage of this initial depressing action of the punch, to locate the work sheets and preclude shifting thereof during the remainder of the punching operation. In this connection, it is noted that the forming die elements 122, 122 are flanked by cutting die elements 158 and 160 (see FIGS. 1 and 4), which are spaced apart in parallelism with one another a distance slightly in excess of the thickness of punch 24. The upper edges of the cutting die parts are provided with transverse notches 162 and 164. The workpieces when placed within the throat 30 for stitching, overlie the notches 162 and 164 (FIG. 1), so that punch 24 in descending upon the workpieces, initially displaces some of the sheet material into the notches, for the purpose of precluding inadvertent shifting of the workpieces throughout the subsequent period of cutting and curling of the tongues 148 and 150 by the punch and the forming die recesses 140.

Otherwise stated, the punch and the notches 162, 164 perform automatically to establish and maintain a favorable positioning of the work sheets relative to one another while the sheets are undergoing stitching. The fact that the detents 154 formed by the punch and notches 162, 164 remain in evidence after completion of the stitching operation, is not considered objectionable in the finished product.

The cutting die elements 158 and 160 may be attached by means of screws 124 to a supporting block 166 (FIG. 4), which in turn is fixed to base 20 by the screws 134. Block 166 may include an upper concave seat 168 to correspond with a complementary seat 170 of base 20, to support the medial foot 174 of an adjustable work guide 172, the purpose of which guide is to limit insertion of workpieces into the throat 30 during the stitching operation. The work guide may include a stem 176 to be anchored by means of a set screw 178, at various positions of longitudinal adjustment of the stem. FIG. 3 clearly shows the guide 172 in position to locate the workpieces W, W relative to punch 24, so that stitches 152 will be uniformly spaced from an edge of the workpiece during application.

Following the formation of a stitch by the co-action of the punch and dies, the punch will of course be retracted to the FIG. 1 position. In so retracting, the punch will tend to lift the stitched workpiece, and it will therefore be necessary to strip the workpiece from the punch. This function is performed by a pair of stationary strippers 180, 180 secured to column 22 at opposite sides of punch 24 by means of screws 182. The strippers extend downwardly from the lower end of the column, to overlie the forming dies with clearance sufficient for insertion of workpieces between the dies and the strippers.

In use, the apparatus is normally conditioned according to FIGS. 1 and 6, wherein is shown the punch 24 and plunger or body 34 in the elevated position, and valve 38 lowered by means of spring 42. Air under pressure is present in handle bore 46, valve chamber 48, port 52, and column chamber 54, to maintain the plunger or body 34 at the upper limit of its stroke. The chamber above body 34 will be vented to atmosphere through ports 64, 62, 60 and 74.

Work sheets W, W may now be presented to the punch and die area within throat 30, to the extent permitted by work guide 172.

To operate the device, an operator will lift valve actuator 36 against valve stem 40, to elevate valve spool 38 against the force of spring 42. The extent of upward movement of the valve spool is sufficient to place valve head 72 above the level of port 52, so that said port may exhaust through vents 70 and thereby relieve the pressure of air from chamber 54 beneath plunger or body 34. At the same time, air under pressure will be directed, through valve 38, from source 46 to port 50, chamber 48, port 60, and ports 62 and 64, to act upon the top portion 68 of the plunger or body for lowering the latter within chamber 54.

As the plunger or body 34 descends, carrying with it the anvil 88 and mounting block 104, the punch 24 fixed to the mounting block will descend upon the workpieces. If the workpieces are not too thick or hard, the punch at this time will indent them as at 154, before penetration of the workpieces. The indentations or detents 154 will, as previously explained, serve as locators precluding undesirable shifting or skidding of the workpieces during penetration by the punch.

After the punch has forcefully impinged upon the workpieces, the punch advancement will be thereby momentarily retarded. Air under pressure at the top of plunger or body 34 will accordingly be induced to more forcefully enter a port 184 at the top of the plunger or body 34, FIG. 1.

Port 184 feeds air under pressure to a hammer mechanism built into plunger or body 34, for rapidly and forcefully reciprocating the weight 96, causing the weight to rapidly pound the anvil 88. As the weight repeatedly pounds the anvil, punch 24 is thereby progressively driven through the workpieces to complete the stitch, aided of course by the forming and cutting dies supported upon base 20

It is here pointed out that the present disclosure is not concerned with the details of the hammer mechanism necessary to actuate weight 96, which is a part thereof. Such hammer mecanisms operated pneumatically, are devices well known and very commonly used in tools for hammering, riveting, chiseling, cutting and the like. Such hammer mechanisms are extensively manufactured and marketed by Superior Pneumatic and Manufacturing, Inc., of Cleveland, Ohio. This supplier produces hammer mechanisms for hand tools, such as its Big Bully, and Bantam Bully air hammers, which include weight throwing mechanisms dimensioned to fit within the plunger or body 34 of the instant disclosure. Moreover, suitable weight-reciprocating hammer units pneumatically operated may be found disclosed in numerous issued patents.

In accordance with the foregoing statement, it should be understood that the present disclosure is not intended to treat in detail the intricacies of any pneumatic weight-reciprocating hammer unit which may be housed within plunger or body 34. Such unit, therefore, is illustrated conventionally only.

At the top of main column 22 is shown a ring 186. This ring serves as a means for bodily suspending the tool in balance from a chain or cable should such supprot be considered desirable in manipulating the tool.

Referring to FIG. 4, the reference character 188 indicates a screw that passes through the main housing to enter the threaded bore 190 of guide sleeve 80, for locking the sleeve securely within the housing bore. The sleeve also has a slot 192 in the lower portion of its wall or skirt, to register with slot 106 so that punch mounting block 104 may slide vertically within slots 106 and 192 as body 34 shifts longitudinally of column 22.

Referring to FIGS. 1 and 4, the reference character 194 indicates a contractible retainer ring for cap 66, to preclude accidental displacement of the cap. A plug 196 closes the upper end of air channel 60. A plug 198 serves to retain the spring 42 of control valve 38, and to close the upper end of the valve chamber. The lower end of said valve chamber may be fitted with a bushing 200 for guiding the valve stem 40. The bushing may carry the exhaust ports 70 previously mentioned.

Control valve 38 may be of any appropriate type which will operate to exhaust air from port 60 while feeding air to port 52, and alternatively, to exhaust air from port 52 while feeding port 60. In the example illustrated, this valve comprises an inner spool 38 slidable within cylindrical sleeve sections 202, 204, and 206, suitably gasketed and ported to provide for feeding and exhausting of the several interrelated ports as the spool is shifted in the manner previously explained, by means of trigger 36 and spring 42. The air supply to the valve may be filtered by means of a strainer or filter 208, FIG. 1.

With reference now to FIGS. 7 to 11, it is pointed out that a metallic work sheet may be stitched to various kinds of sheet materials, utilizing the apparatus of the invention. For example, in FIG. 7, the upper and lower sheets W, W may both be of metal, either similar or dissimilar, and may be of the same or different gauge measurements. In the example of FIG. 9, the upper work sheet is of metal, and the lower sheet is shown as corrugated paper board or very stiff fabric.

In the example, FIG. 8, the upper work sheet W is metal, and the lower sheet may be a material such as fiber, semi-hard rubber, plastic, or other form of sheeting which can be cut and curled to provide a stitch connection with the curl of the upper metallic sheet.

FIG. 10 illustrates two metallic angle strips joined together by stitching in the manner of FIG. 7. In the example illustrated by FIG. 11, there is shown a corner portion of a corrugated board carton reinforced by a metallic corner piece stitched thereto at various locations, to strengthen the carton corner. The stitch here resembles that of FIG. 9. Many other sheet-like items may be stitched together in flatwise contact, utilizing the method and means of the present invention, as will be understood.

In constructing devices according to the present disclosure, they may be dimensioned to suit the nature of the work to be performed. Moreover, a device constructed according to the present disclosure may be fitted with different sets of punches and dies, to produce stitches which may vary as to length and/or width, depending upon the nature of the work sheets, or the severity of the service to be rendered.

It should be understood that, under some conditions, more than two work sheets may require joining by stitching. The device of the invention is constructed to meet such a requirement also.

The replacement or substitution of punches or dies in the device is accomplished with ease and despatch, particularly in view of a self-aligning feature incorporated therein. Removal of the punch involves simply the removal of screws 102. The dies are released by removing the screws 124. By reversing the procedure, new or different punches and dies may be mounted.

Adjustment is confined to the dies alone, and involves merely loosening the die screws 124, 124, while the punch is in elevated position. Then by applying the aligning tool 120 (FIG. 6), and lowering it to the broken line position 210 of FIG. 6, the punch point is driven between the dies to separate them, as indicated by the broken lines 212. Upon retightening the die screws 124, 124, the dies will be found perfectly aligned and fitted to the punch, in readiness for a stitching operation.

The aforesaid retightening of die screws 124 does not lock the dies in the separated position, because the spacers 126, 126 provide lateral clearance for free shifting of the dies toward one another under the influence of the compression springs 128. That is, the spacers 126 are under lengthwise compression when screws 124 are tightened, leaving the dies free to shift toward and from one another.

The device of the invention can be constructed to perform light or heavy work, with little basic changes of structure. For example, it may be constructed to accommodate light or heavy pneumatic hammer units within the reciprocative plunger or body 34; or the base 20 may be designed to accommodate various sizes or types of dies, to produce tighter curl or curls of differing characteristics suited to the materials being stitched.

Punch 24, FIG. 4, has a fullness at the top thereof which serves to accurately align the punch when hand lever 120 is lowered and the die is set and tightened into position.

The foregoing and various other modifications and changes may be made in the device within the scope of the appended claims, without departing from the spirit of the invention.

What is claimed is:

1. A pneumatic impact device for operating upon a workpiece, comprising in combination: a column, and a main body reciprocable relative to the column toward and from the workpiece; pneumatic means for selectively shifting said main body relative to the column, between alternative positions of advancement and retraction relative to the workpiece; control means for said pneumatic means, normally operative to bias the reciprocable main body pneumatically toward the position of retraction, said control means being manually actuatable to initiate advancement of said main body by the pneumatic means aforesaid, a work engaging tool carried by the reciprocable main body to forcefully contact the workpiece upon advancement of the main body; a die member for supporting the workpiece; and a pneumatically operated rapidly reciprocative flying weight carried by the reciprocative main body, and supported thereby in position to deliver successive hammer blows upon the tool; said work engaging tool comprising a punch to penetrate the workpiece and cut the workpiece along parallel lines to form a pair of opposed narrow tongues each having a base end remaining connected to the workpiece, and a free end displaced in a common direction from the workpiece plane; said die member including a pair of curved die surfaces cooperative with the punch to induce spiral curling of the free ends of the tongues into roll formation at one face of the workpiece concurrently with advancement of the punch under the rapid impacts of said flying weight.

2. The device according to claim 1, wherein is included a lost-motion connection between the tool and the reciprocative main body, providing for a limited reciprocative movement of the tool relative to said main body.

3. A pneumatic impact devise for operating upon a workpiece, comprising in combination: a column, and a main body reciprocable relative to the column toward and from the workpiece; pneumatic means for selectively shifting said main body relative to the column, between alternative positions of advancement and retraction relative to the workpiece; control means for said pneumatic means, normally operative to bias the reciprocable main body pneumatically toward the position of retraction, said control means being manually actuatable to initiate advancement of said main body by the pneumatic means aforesaid; a work engaging tool carried by said reciprocable main body to forcefully impinge upon the workpiece incident to advancement of the main body; a notched member for supporting the workpiece while engaged by said tool, the notch of said member being located in close proximity to the point of contact of the tool upon the workpiece; and a pneumatically operated rapidly reciprocative flying weight carried by the reciprocative main body, and supported thereby in position to deliver successive hammer blows upon the tool in the direction of the workpiece.

4. The device according to claim 3, wherein the work engaging tool consists of a punch to penetrate the workpiece adjacent to the notch, and to cut the workpiece along parallel lines to form a pair of opposed narrow tongues each having a base end remaining connected to the workpiece, and a free end displaced in a common direction from the workpiece plane; and wherein the notched member supporting the workpiece includes a pair of forming die surfaces cooperative with the punch to induce curling of the free ends of the tongues into roll formation at one face of the workpiece as the punch advances from the retracted position.

5. The device according to claim 4, wherein the combination includes means for stripping the workpiece from the punch incident to pneumatic shifting of the main body to the normally retracted position.

6. A pneumatic stitcher for joining flat workpieces in face contact, at least one of which workpieces is of sheet metal, said stitcher comprising; means for supporting the workpieces in face contact; a shiftable punch having a sharp leading edge to penetrate the workpieces, and other edges to cut opposed narrow tongues from the workpieces; said tongues each having a base remaining attached to the workpieces, and each having a free end displaceable from the planes of the workpieces incident to advancement of the punch; and tongue-curling means including associated with the workpiece support, to roll the tongues of a superposed workpiece about the curled tongues of a subjacent workpiece; thereby to join the workpieces together at the curls utilizing solely the materials of the workpiece in effecting the joint.

7. The device according to claim 6, wherein the punch is in the shape of a wedge, and the tongue-curling means comprises a pair of independently shiftable dies movable in opposite directions along a line normal to the line of reciprocation of the punch, the punch being advanceable between the dies and against the tongues while curling, to separate the dies from one another; and resilient means tending constantly to move the dies toward one another.

8. The device according to claim 7, wherein the combination includes pneumatic hammer means operative upon the punch as the punch advances in penetrating the workpieces and forming the tongues therein.

9. A stitcher for joining flat workpieces in face contact, at least one of which workpieces is of sheet metal, said stitcher comprising; means for supporting the workpieces in face contact; a shiftable punch having a sharp leading edge to penetrate the workpieces, and another edge to form coinciding elongate tongues in the workpieces, said tongues each terminating in one free end while the opposite end thereof remains attached to the workpiece from which it was formed; the second-mentioned edge of the punch being inclined at an acute angle to the line of punch advancement, for displacing the free ends of the tongues away from the plane of the workpieces as the punch advances; and tongue-curling means including curved forming surfaces associated with the workpiece support, to roll the tongue of a superposed workpiece about the curled tongue of a subjacent workpiece, thereby to join the workpieces together at the curls utilizing solely the materials of the workpieces in effecting the joint.

10. The device according to claim 9, wherein the combination includes pneumatic hammer means operative upon the punch as the punch advances in penetrating the workpieces and forming the tongues therein.

11. A pneumatic stitcher for joining flat sheets in face contact, at least one of which sheets is of ductile metal; said stitcher comprising; a base to support the overlapped sheets; an elongate column bored longitudinally, and having ports therein for delivery and exhaust of compressed air near opposite ends of the bore; a hollow shiftable main body supported in the bore for movement from a retracted position near one end of the bore, to a position of advancement near the opposite end of the bore; means for supplying compressed air to the aforesaid ports selectively in alternation for shifting the main body in opposite directions within the bore; a punch carried by the main body to penetrate the sheets and form coinciding narrow tongues therein upon advancement of the main body by the force of compressed air, the tongues each having a base end integral with a sheet, and a free end displaceable by the punch from the plane of its sheet; and means carried by the base for curling the free ends of the displaced tongues one about the other, with the tongue of the metal sheet embracing and enclosing the tongue of the remaining sheet to form a tight roll at which the sheets are joined; and a pneumatic hammer unit encased within the hollow interior of the shiftable main body, said hammer unit including means for delivering a succession of rapid impacts upon the punch concurrently with advancement of the punch while penetrating the workpiece, forming the tongues, and curling the tongues to tight roll formation.

12. A pneumatic stitcher for joining flat sheets in face contact, said stitcher comprising; a base to support the overlapped sheets; an elongated column spaced from the base, said column being bored longitudinally and having ports therein for delivery and exhaust of compressed air near opposite ends of the bore; a hollow shiftable main body supported in the bore for movement from a retracted position near one end of the bore, to a position of advancement near the opposite end of the bore; means including a manually actuatable valve for directing compressed air selectively to the ports near opposite ends of the bore, for pneumatically shifting the main body in opposite directions within the bore; means biasing the valve to normally feed compressed air for maintaining the main body in the retracted position; a punch carried by the main body to penetrate the sheets and form coinciding narrow tongues therein upon advancement of the main body, the tongues each having a base end integral with a sheet, and a free end displaceable by the punch from the plane of its sheet; means carried by the base including curved forming surfaces for curling the displaced free ends of the coinciding tongues one about the other, to form a tight roll incorporating both tongues, for locking the sheets together; and a pneumatic hammer unit encased within the hollow interior of the shiftable main body, said hammer unit including a flying weight activated by a portion of the air utilized for advancing said shiftable main body, and said weight operating to deliver a succession of rapid impacts upon the punch as the punch and the shiftable main body advance toward the sheets to be joined.

13. The device according to claim 12, wherein there is included a lost-motion connection between the punch and the shiftable main body, providing for a limited reciprocative momement of the punch relative to said main body; and means carried by the column for stripping the connected sheets from the punch incident to retractile movements of the main body from the curling means.

14. A pneumatic stitcher for joining flat sheets in face contact, said stitcher comprising: a base to support the overlapped sheets; an elongate column spaced from the base, said column being bored longitudinally and having ports therein for delivery and exhaust of compressed air near opposite ends of the bore; a hollow shiftable main body supported in the bore for movement from a retracted position near one end of the bore, to a position of advancement near the opposite end of the bore; means including a manually actuatable valve for directing compressed air selectively to the ports near opposite ends of the bore, for pneumatically shifting the main body in opposite directions; means biasing the valve to normally feed compressed air to retract the main body; an anvil member having a lost-motion connection with the main body, whereby the anvil member has limited reciprocatory movement relative to the main body; a punch secured to the anvil member, said punch having a sharpened wedge-shaped end to penetrate the overlapped sheets and form therein pairs of coinciding tongues, said tongues having base ends integral with the sheets, and free ends displaceable from the planes of the sheets by the wedging action of the punch end; a pair of opposed forming dies movable upon the base toward and from one another, and resilient means normally urging the dies toward one another, the dies being separable by entry of the wedge end of the punch therebetween; an arcuate curling face on each die adapted to turn and curl into roll formation the tongue ends directed thereto by the wedge-shaped end of the punch, with a tongue of one sheet entwined about a tongue of another sheet, to effect sheet joinder; and a pneumatic hammer unit encased within the hollow interior of the shiftable main body, said unit including a flying weight activated by a portion of the air utilized for advancing said shiftable main body, and said weight operating to deliver a succession of rapid impacts upon the anvil member as the shiftable main body is advanced pneumatically toward the sheets to be joined.

15. The device according to claim 14, wherein the combination includes, means responsive to manual advancement of the wedge end of the punch, to separate the forming dies for self-adjustment thereof to the line of advancement of the punch.

16. The method of joining flat sheets in face contact, at least one of which sheets is of ductile metal, said method comprising: supporting the sheets in overlying flat contact; advancing a wedge-shaped punch at substantial right angles against face of the metal sheet, to penetrate the metal sheet and any subjacent sheet underlying the metal sheet; continuing the punch advancement to induce cutting of the sheets by the wedge-shaped portion of the punch along straight substantially parallel lines, to produce in each sheet an elongate tongue having one end free and the opposite end integral with the sheet from which the tongue is struck; and subjecting the free ends of the tongues to a forming die cooperating with said punch which curls the tongues simultaneously into a roll as they are produced, with the tongue of the metal sheet constituting the outer convolution of the roll, thereby to join the sheets utilizing solely the tongues struck from the sheets by the advancing punch.

17. The method according to claim 16, wherein the punch in advancing is rapidly and repeatedly hammered to drive it through the sheets while producing the tongues and directing said tongues to the forming die for curling.

18. The method of joining flat sheets in face contact, at least one of which sheets is of ductile metal, said method comprising: supporting the sheets in face contact compilation upon a notched support; advancing a chisel-edged wedge-shaped punch at substantial right angles onto the compilation of sheets, with the chisel edge of the punch striking initially the metal sheet and indenting said metal sheet and those sheets subjacent thereto, into the notch of the support aforesaid, thereby to locate the compilation of sheets relative to the support; continuing the punch advancement to induce cutting of the sheets by the wedge portion of the punch along substantially parallel lines, to produce in each sheet an elongate tongue having one end free and the opposite end integral with the sheet from which the tongue is struck; and subjecting the free ends of the tongues to a forming die which curls the tongues of the several sheets simultaneously into a roll, with the tongue of the metal sheet constituting the outer convolution of the roll, thereby to join the sheets utilizing solely the tongues struck from the sheets by the advancing punch.

19. The method according to claim 18, wherein the punch in advancing is rapidly and repeatedly hammered to drive it through the sheets.

20. A stitcher for joining flat workpieces in face contact, at least one of which workpieces is of sheet metal, said stitcher comprising; means for supporting the workpieces in face contact; a shiftable punch having a sharp leading edge to penetrate the workpieces, and other edges to cut opposed narrow tongues from the workpieces; said tongues each having a base remaining attached to the workpieces, and each having a free end displaceable from the planes of the workpieces incident to advancement of the punch; and tongue-curling means including curved forming surfaces associated with the workpiece support, to roll the tongues of a superposed workpiece about the curled tongues of a subjacent workpiece; thereby to join the workpieces together at the curls utilizing solely the materials of the workpieces in effecting the joint.

21. The device according to claim 20, wherein the punch is in the shape of a wedge, and the tongue-curling means comprises a pair of independently shiftable dies movable in opposite directions along a line normal to the line of reciprocation of the punch, the punch being advanceable between the dies and against the tongues while curling, to separate the dies from one another; and resilient means tending constantly to move the dies toward one another.

22. The device according to claim 21, wherein the combination includes a rapid multiple-impact hammer means operative upon the punch as the punch advances in penetrating the workpieces and forming the tongues therein.

References Cited
UNITED STATES PATENTS

| | | | |
|---|---|---|---|
| 1,792,888 | 2/1931 | Benedict | 173—155 X |
| 1,984,020 | 12/1934 | Johnson | 72—399 X |
| 2,302,069 | 11/1942 | Stephens | 173—133 X |
| 2,333,966 | 11/1943 | Weiss | 113—116 |
| 2,822,545 | 2/1958 | Eickhoff | 72—312 |
| 2,865,451 | 12/1958 | Ihrig. | |
| 2,887,686 | 5/1959 | Wandel et al. | 173—155 X |
| 3,010,199 | 11/1961 | Smith et al. | 113—116 X |
| 3,042,004 | 7/1962 | Fischer et al. | 173—133 |
| 3,110,079 | 11/1963 | Wilson et al. | 72—325 |

FOREIGN PATENTS 745,380   2/1956   Great Britain.

JOHN F. CAMPBELL, Primary Examiner

CARL E. HALL, Assistant Examiner

U.S. Cl. X.R.

29—21.1, 521; 72—325, 399